UNITED STATES PATENT OFFICE.

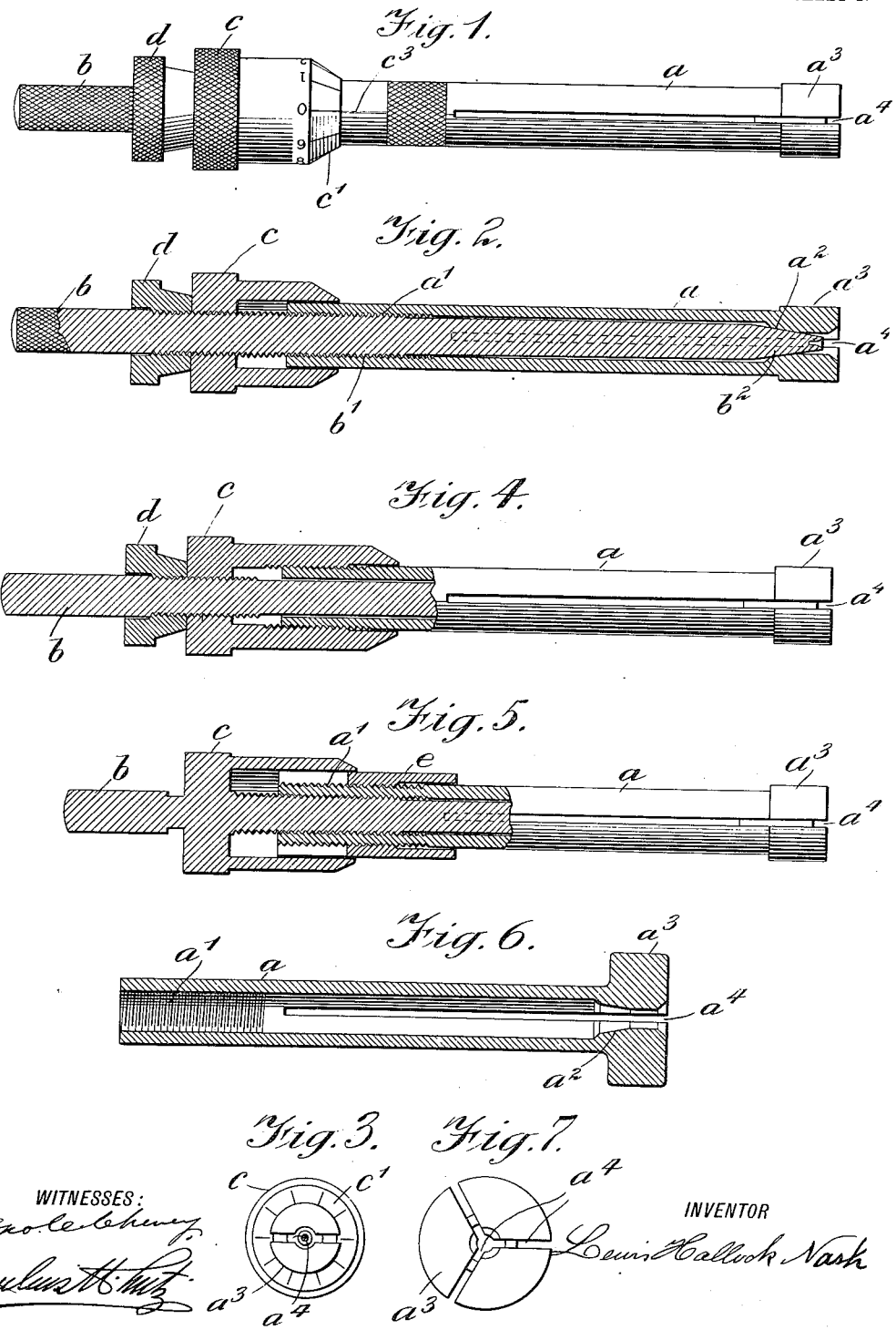

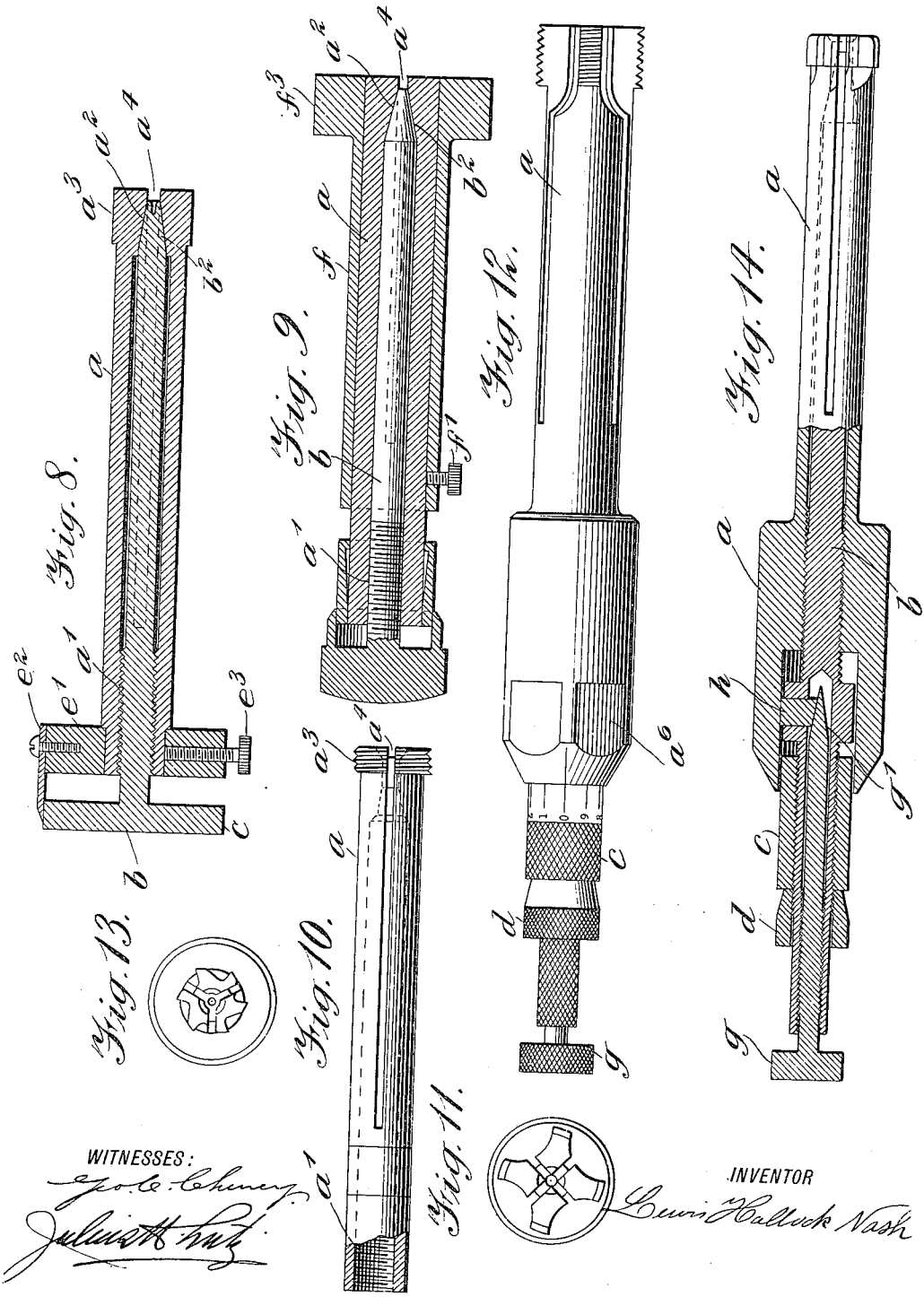

LEWIS HALLOCK NASH, OF SOUTH NORWALK, CONNECTICUT, ASSIGNOR TO NASH ENGINEERING COMPANY, OF NEW YORK, N. Y., A CORPORATION OF NEW YORK.

MEASURING INSTRUMENT AND SIMILAR TOOL.

953,282.

Specification of Letters Patent. Patented Mar. 29, 1910

Application filed July 20, 1909. Serial No. 508,647.

*To all whom it may concern:*

Be it known that I, LEWIS HALLOCK NASH, a citizen of the United States, and resident of South Norwalk, in the county of Fairfield and State of Connecticut, have invented certain new and useful Improvements in Measuring Instruments and Similar Tools, of which the following is a specification.

My invention is directed to making a measuring instrument, as for instance, calipers, which is especially adapted for use in determining the exact size of small holes, but, so far as I know, no instrument of precision is available for this purpose, and my invention relates to certain features which make it possible to secure great accuracy in obtaining such measurements, and also to be used as a gage for determining whether the hole is true in all respects.

I have shown in the drawings several modifications in form of my invention in order to show others skilled in the arts how to use my invention, but it will be understood that I do not confine myself to the exact forms of structures herein shown, as many modifications can be made without departing from the spirit and scope of my invention.

The matters of improvement which I claim as my invention will be pointed out in the claim concluding these specifications.

While I have shown my invention primarily as directed to a means for measuring the size of a hole, it may also be applied to means for producing the hole, as for a reamer or a tap and kindred cutting tools.

I will now describe the drawings which illustrate the various modifications of devices embodying my invention.

Figure 1 is an external view of an internal micrometer for measuring round holes; Fig. 2 is a section through the same; Fig. 3 is a view looking at the end of Fig. 1; Fig. 4 shows a modified form of the device illustrated in Fig. 2, showing partly in section and partly in elevation; Fig. 5 is a second modification; Fig. 6 shows a form of caliper in which the measuring end is enlarged; Fig. 7 is an end view of Fig. 6; Fig. 8 is a modified form of the device; Fig. 9 shows a further modification; Fig. 10 shows an instrument for measuring a threaded hole; Figs. 11 and 12 show a tap having my invention in which the Fig. 11 is a view looking at the end of the tap; Figs. 13 and 14 are views of a similar device used as a reamer, in which Fig. 13 is looking at the end of the view shown in Fig. 13.

I will now describe the modifications shown in Figs. 1, 2 and 3. The device consists of a tube, $a$, having a thread at $a^1$, and a taper seat in its interior at $a^2$; into this tube is inserted a rod, $b$, which is provided with a thread, $b^1$, which fits into the thread in the tube and is also provided with a taper end $b^2$, which fits into the taper seat of the tube. The tube, $a$, has an enlarged portion, $a^3$, which is the measuring end of the instrument, and said tube is also split by two or more slots, $a^4$, so that it is able to expand as the rod $b$, is driven into its taper seat. $c$ is a knurled thumb nut, which fits upon the thread of the rod, $b$, and which is graduated in micrometer divisions, as shown at $c^1$ of Fig. 1. $d$ is a lock nut, also fitted on the thread of the rod, $b$, which serves to fasten the nut, $c$, so that it cannot turn around. In the modifications shown in Figs. 1, 2 and 3, the measuring end, $a^3$, is divided into halves, and the diameter of these halves can be measured by any suitable means, as for instance, by a micrometer or a gage hole, which dimension may be taken as the standard from which variable measurements are taken.

In the use of the instrument, the nut, $c$, is turned until the zero division coincides with the line, $c^3$, upon the tube, $a$, at the time when the measuring part, $a^3$, has been set to the size required and the lock nut, $d$, is then used to fasten the graduated nut, $c$, upon the rod, $b$, so that they will rotate together. The split tube, $a$, is designed to spring inward by its own elasticity and to be forced out by the wedging action of the rod, $b$; it therefore follows that if the nut and rod, $b$, are revolved so as to withdraw the wedge, that the measuring portion of the instrument will decrease in diameter by an amount dependent upon the pitch of the threads and also of the taper of the wedging part, $b^2$. By suitably proportioning these parts, this motion may be accurately determined in portions of a revolution of the nut, $c$, as for instance, each division on said nut may represent a one thousandth part of an inch, and each semi-division a proportionate contraction. Therefore, the exact diameter of the measuring portion, $a^3$, will be indicated by the position of these graduations on the nut, $c$. The extent of this range of variation in size will depend upon the elasticity of the material in the tube, $a$, and is sufficient for determining variations within certain limits. The measuring portion of the instrument may be made of any desired width, and therefore can be placed in the hole at the portion which it is desired to measure, and the instrument can be adjusted until it accurately records the size of the hole at that point.

When it is desired to measure the diameter of a thread, the end of this instrument is modified as shown in Fig. 10, in which the portion, $a^3$, has a thread cut upon it of the screw pitch of the hole which it is desired to measure. In this way, the exact diameter of a tapped hole may be determined by test. When it is desired to measure holes of different diameters, it is necessary to have a series of tubes such as shown in Fig. 6, in which the portion $a^3$, is enlarged, to fit the hole of a greater diameter than that shown in Fig. 1. By using a series of these tubes holes of any desired diameter may be measured.

In Fig. 4, the nut, $c$, is threaded, so as to fit upon a thread formed upon the tube, $a$, and this thread determines the travel of the rod, $b$. The jam nut, $d$, operates in the same way as before, to secure the nut, $c$, upon the rod $b$, while it is being used as a measuring instrument. This is a simple modification and in no wise alters the principle of operation of the instrument.

In the modification shown in Fig. 5, the nut, $c$, is formed integral or permanently fixed upon the rod, $b$. The tube, $a$, in said figure, is threaded at the end and a nut, $e$, is used which fits upon the thread on said tube $a$. In the use of this instrument, the nut, $c$, being graduated as before, the nut, $e$, is turned around until a line made upon it coincides with the zero mark on the nut, $c$. When it is fixed by any suitable means, as for instance, by its own elasticity, it can be made to clamp itself upon the rod, $a$. It will be understood, therefore, that as the measuring rod $b$, with the nut, $c$, are rotating, the zero line will remain fixed in position upon the nut, $e$, and the graduations may be read from said line.

Fig. 8 is a modification of Fig. 5, in which the zero mark is carried by a washer, $e^1$, which has secured to it a pointer, $e^2$. The enlarged end of the rod, $b$, is graduated and the graduations are referred to the pointer, $e^2$. The zero mark can be adjusted by rotating the washer, $e^1$, and securing it by means of the thumb screw $e^3$.

It will be understood that these are simple modifications, showing different ways in which the adjustment of the zero mark can be secured. The measuring operation of each device is similar in each case.

In Fig. 9 a modification is shown, which can be applied to any of the forms illustrated in the figures above described for the sake of measuring holes of different diameters. This modification consists of a tube, $f$, which is arranged to slip over the tube, $a$, shown in the previous figures and which can be secured in position by a thumb screw, $f^1$. This tube is also slotted, the slots being arranged to correspond with those in the tube, $a$, and the measuring end, $f^3$, is made of the size which it is intended to caliper. This tube, $f$, can be removed from the measuring instrument and another one of different sized end slipped over in place. The expanding action of the rod, $b$, in altering the diameter of the tube, $a$, will be communicated to the tube, $f$, and the operation of measuring will be the same as before described. I have shown the instrument as having its extended portion, $f$, formed in a tube split as shown; but it will be understood that the enlarged portions, $f^3$, may be secured to the end of the tube, $a$, in any desired way, as for instance, by screws or otherwise, and I do not confine my invention in these respects to the exact means by which the extended measuring end is made interchangeable; but have shown in said Fig. 9 what I consider the most simple and effective means of securing this desired result.

When the instrument is to be used as a cutting instrument, the extended portion of the tube, $a$, will have formed upon it a cutter, either of a threaded end as shown in Figs. 11 and 12, or of a fluted end as shown in Figs. 13 and 14. A portion of the tube, $a$, may be formed so as to receive a wrench as shown in $a^6$, for the sake of driving the tube.

In these modifications, above referred to, a form of locking device is shown, which consists of a thumb nut, $g$, which is arranged with a taper end, $g^1$, so as to drive out a small wedge, $h$, into the portion of the tube, $a$, and thus prevent the rod, $b$, from rotating when it is secured in position. The operation of this instrument will be readily understood by fitting the cutting end into a standard die of a definite size and turning adjusting parts until they have been brought to zero, the instrument will be adjusted to a definite size. The size can then be varied at will by turning the rod, $b$, with its fixtures, into the position which indicates the size which it is desired to use. One great advantage of the forms shown in these cutting tools is, that the cutting action can be applied to the very bottom of any hole which it is desired to machine, and also the fact that the size which is secured is measured at the same time by the micrometer readings; and a further advantage is that by gradually increasing the size of the cutting instrument, a very perfect hole can be secured of any size desired within the range of the instrument. It will be understood also, that the diameter of the cutting end can be varied by making a series of tubes, *a*, of various sizes, as has been previously described in the instruments intended only for measuring.

I will now describe in the claims those features of improvement which I desire to cover by Letters Patent, it being understood that the omission of any element in any claim is a formal notice to the public that the said element is not an essential feature of the invention of said claim.

I claim—

In a measuring instrument, a tube split at one end forming expansible jaws, said tube being provided with an interior screw thread at the other end, combined with a spindle having a screw thread fitting the said tube and having a point tapering outward at the other end; a barrel supported on the thread of said spindle and having graduations showing the rotation of said barrel, and means for locking the said barrel and spindle to each other so that they will rotate together.

In testimony whereof I have hereunto signed my name in the presence of two subscribing witnesses.

LEWIS HALLOCK NASH.

Witnesses:
ARTHUR GOAT,
M. E. McNINCH.